United States Patent
Heng et al.

(10) Patent No.: US 9,588,224 B2
(45) Date of Patent: Mar. 7, 2017

(54) PROXIMITY-SENSING DEVICE

(71) Applicant: Avago Technologies General IP (Singapore) Pte. Ltd., Singapore (SG)

(72) Inventors: Cherng Woei Heng, Negeri Sembilan (MY); James Costello, Singapore (SG); Wee Sin Tan, Singapore (SG)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 199 days.

(21) Appl. No.: 14/640,048

(22) Filed: Mar. 6, 2015

(65) Prior Publication Data
US 2016/0259056 A1   Sep. 8, 2016

(51) Int. Cl.
G01S 17/08   (2006.01)
G01S 17/02   (2006.01)
G01S 7/481   (2006.01)

(52) U.S. Cl.
CPC ............ G01S 17/08 (2013.01); G01S 7/4813 (2013.01); G01S 17/026 (2013.01)

(58) Field of Classification Search
CPC ........ G01S 17/08; G01S 17/02; G01S 17/026; G01S 7/481; G01S 7/4813
USPC .............................................. 250/221, 214.1
See application file for complete search history.

(56) References Cited

U.S. PATENT DOCUMENTS

| | | | |
|---|---|---|---|
| 2010/0109021 A1* | 5/2010 | Horio | H01L 31/167 257/82 |
| 2011/0084903 A1* | 4/2011 | Onishi | G01J 1/02 345/157 |
| 2012/0188171 A1 | 7/2012 | Alameh et al. | |
| 2013/0153755 A1* | 6/2013 | Pikkujamsa | G01V 8/12 250/221 |
| 2014/0103199 A1 | 4/2014 | Loong et al. | |

FOREIGN PATENT DOCUMENTS

WO   2014029839 A2   2/2014

OTHER PUBLICATIONS

Schmitz, Tamara, "Know Your Tradeoffs Before Placing Your Sensors", available at http://electronicdesign.com/components/know-your-tradeoffs-placing-your-sensors, Feb. 1, 2013, 5 pages.

* cited by examiner

*Primary Examiner* — Seung C Sohn (57) ABSTRACT

A proximity sensing device having an emitter die, a receiver die, a body is disclosed. The proximity sensor has an optical structure provided on the body. The optical structure may provide an optical path to allow radiation reflected by a near object that may be otherwise blocked by the body to be transmitted towards the receiver die. In addition to the proximity-sensing device, a sensing device having at least two trenches that allow close proximity sensing is disclosed. A method for sensing an object that involve determining whether the object correspond to a near object or a far object is presented.

20 Claims, 11 Drawing Sheets

PROXIMITY-SENSING DEVICE

BACKGROUND

Proximity-sensing devices are sensor devices configured to detect presence of nearby objects without physical contact. Proximity-sensing devices are commonly used in electronic gears that will turn power-consuming circuitry on or off in response to the proximity-sensing devices detecting an object, person, or the like nearby. Use of proximity-sensing devices in such applications may be particularly efficient because they may provide for detecting proximity without having to make physical contact. Proximity-sensing devices may also be used in mobile phone, digital photo frames, television, or other electronic devices.

Generally, a proximity-sensing device has an emitter die and a receiver die. The radiation emitted from the emitter die is usually directed to an external object or an external medium before being received by the receiver die. In response to the radiation detected, the receiver die may generate a signal indicative of at least one property of the external object. For example, for proximity-sensing devices, the signal generated by the receiver die is indicative of presence of the external object within a predetermined distance of the proximity-sensing device.

However, on some occasions where a proximity-sensing device is attached within a transparent casing, a portion of the radiation reflected by the transparent casing may be detected by the receiver die without being reflected by the external object. The radiation detected by the receiver die without being redirected by the external object is often referred to as crosstalk. Crosstalk is independent of the external object and may reduce the signal-to-noise ratio of the proximity-sensing device.

Most proximity-sensing devices available in the market today are designed such that the emitter die and the receiver die are optically isolated. While this reduces crosstalk, detection of a close object such as an object touching the casing or in very close proximity with the proximity-sensing device may not be detected resulting in a blind zone. Designing a proximity-sensing device having minimum crosstalk and capability to detect zero distance objects may be challenging, but such proximity-sensing devices are in high demand. For example, most mobile phone requires a proximity-sensing device that is capable of detecting external object without a blind zone. Unlike the traditional use of proximity-sensing devices in automobile or other home appliances where proximity-sensing devices with blind zones are tolerated, a mobile phone may be held close enough or even touching the user and therefore, proximity-sensing devices for the modern mobile devices are required to detect external objects even at zero distance.

BRIEF DESCRIPTION OF THE DRAWINGS

Many aspects of the invention can be better understood by referring to the following description in conjunction with the accompanying claims and figures. Illustrative embodiments by way of examples, not by way of limitation, are illustrated in the figures. In the figures, like numerals indicate like structural elements and features. For clarity, not every element may be labeled with numerals in each figure. However, such unlabeled elements can be identified by referring to other figures where labeling is provided. The drawings are not necessarily drawn to scale, emphasis instead being placed upon illustrating the principles of the invention. The drawings should not be interpreted as limiting the scope of the invention to the example embodiments shown herein.

DETAILED DESCRIPTION

Figure 1A:
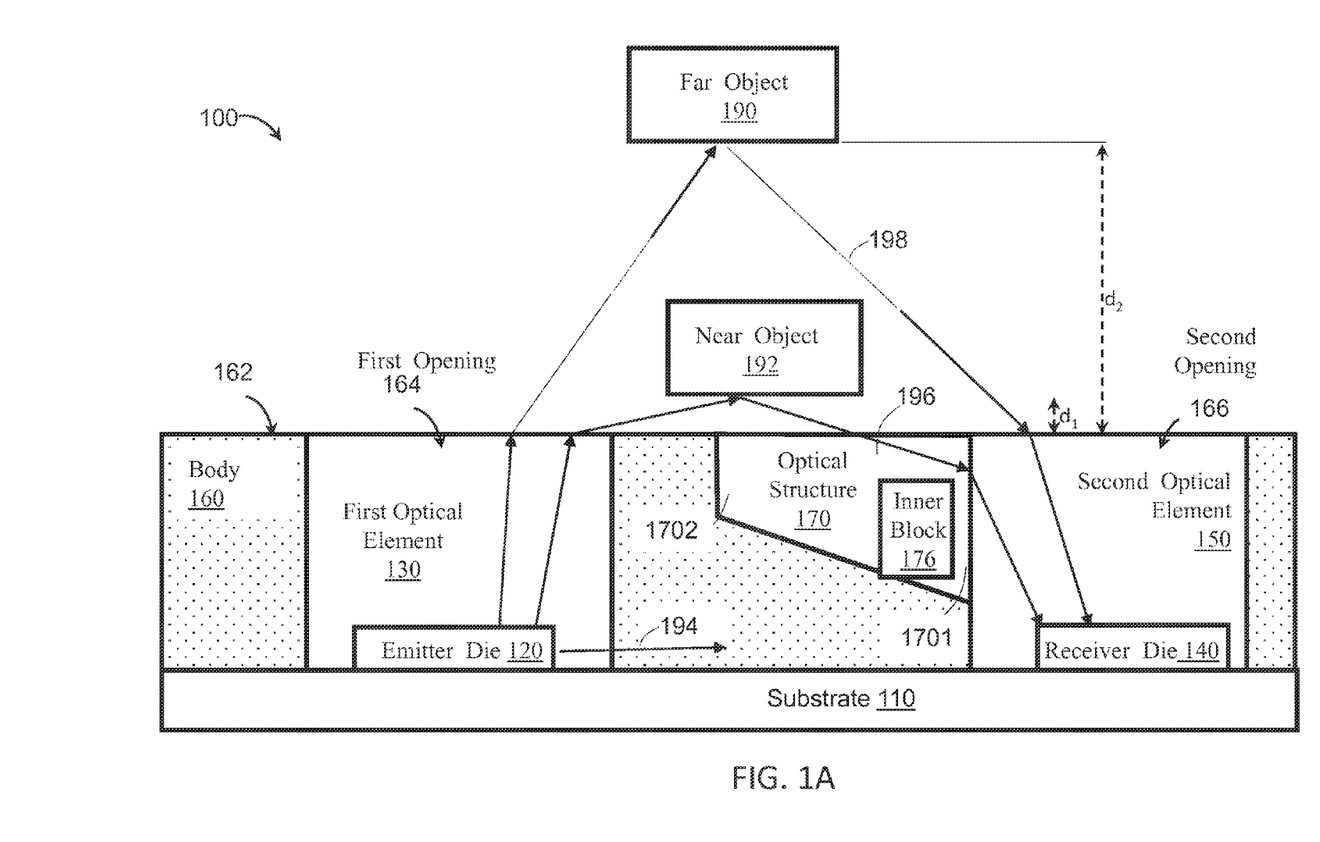
FIG. 1A shows an illustrative block diagram of a proximity-sensing device.

FIG. 1A shows an illustrative block diagram of a proximity-sensing device 100. The proximity-sensing device 100 may comprise an emitter die 120, a first optical element 130, a second optical element 150, a receiver die 140 and a body 160. Optionally, the proximity-sensing device 100 may comprise a substrate 110 such as a printed circuit board to receive and support the emitter die 120 and the receiver die 140. In one embodiment where the proximity-sensing device 100 is made using a molded lead frame package, the substrate 110 may be a portion of a lead frame receiving the emitter die 120 and the receiver die 140 that may be covered by the body 160.

The emitter die 120 may be a light source or a radiation source configured to emit a radiation. The radiation may be visible light or invisible light such as an ultra violet or infrared. The term "light" or "radiation" may be interpreted as only a specific type of electro-magnetic wave but as used herein, all variations of electro-magnetic waves should be taken into consideration when a specific type of light or radiation is discussed unless explicitly expressed otherwise. For example, ultra-violet, infrared, near infrared, and other invisible radiation should be included when considering the term "light" or "radiation" although literally light means radiation that is visible to human eyes. In one embodiment, the emitter die 120 may be a light-emitting diode (referred hereinafter as LED). The radiation may comprise ray 198, ray 196 and ray 194 emitted in various directions as shown in FIG. 1A.

The first optical element 130 may be in optical communication with the emitter die 120. The second optical element 150 may be in optical communication with the receiver die 140. The first optical element 130 and the second optical element 150 may encapsulate the emitter die 120 and the receiver die 140, respectively. The first optical element 130 and the second optical element 150 may be configured to collimate or to redirect the radiation towards a specific direction so as to detect presence of an external object (e.g., far object 190 and/or near object 192). In one embodiment, the second optical element 150 and/or the first optical element 130 may be optical lenses attached to the substrate 110 and/or body 160 of the proximity-sensing device 100. In yet another embodiment, the second optical element 150 and/or the first optical element 130 may be a substantially transparent encapsulant formed in a lens shape to direct light. The second optical element 150 and/or the first optical element 130 may be made from a substantially transparent material such as a clear epoxy or silicone.

The body 160 may substantially cover the emitter die 120 and the receiver die 140. The body 160 may comprise a first surface 162, a first opening 164 and a second opening 166. The proximity-sensing device 100 may be operable to detect an external object positioned adjacent to the first surface 162 of the body 160. In other words, the first surface 162 may be provided facing a direction where the external object is to be detected. The first opening 164 may be formed adjacent to the second opening 166 on the first surface 162 of the body 160. The first opening 164 and the second opening 166 may be configured to accommodate the first optical element 130 and the second optical element 150 respectively such that the radiation emitted by the emitter die 120 may be transmitted through the first opening 164 towards the external object and reflected of off the external object towards the receiver die 140.

Figure 1B:
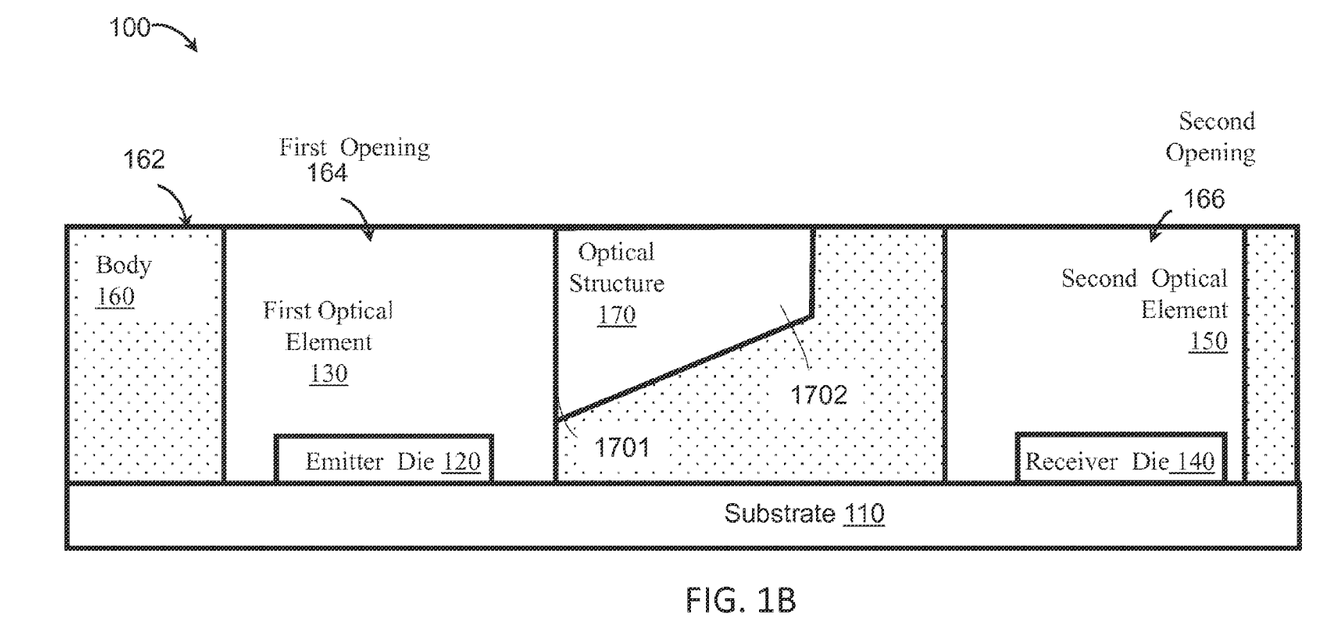
FIG. 1B shows an illustrative block diagram of a proximity-sensing device as an alternative design to the proximity-sensing device shown in FIG. 1A.

The body 160 may further comprise an optical structure 170 provided on the first surface 162 of the body 160. The optical structure 170 may be formed adjacent to and in direct contact with at least one of the first opening 164 and the second opening 166. The optical structure 170 may not be in direct contact with both the first opening 164 and the second opening 166 so as to avoid crosstalk. The optical structure 170 is shown to have a tapering thickness such that the optical structure 170 may have a narrow end 1702 and a wider end 1701 opposing the narrow end 1702. The wider end 1701 may be touching the at least one of the first opening 164 and the second opening 166. As shown in FIG. 1A, the wider end 1701 is in direct contact with the second opening 166. Alternatively, as shown in FIG. 1B, the wider end 1701 is in direct contact with the first opening 166. The proximity-sensing device 100 shown in FIG. 1B is an alternative design to the proximity-sensing device 100 shown in FIG. 1A. In either case, the optical structure 170 may be configured to provide an optical path through a center portion of the body 160 between the emitter die 120 and the receiver die 140. The optical path may be for detecting an external object that presents at close proximity from the first surface 162 of the proximity-sensing device 100.

The optical structure 170 may be in direct contact with the first surface 162 of the body 160, and at least one of the first opening 164 and the second opening 166. As shown in FIG. 1A, the optical structure 170 may comprise an optical path provided between the first surface 162 of the body 160 and the receiver die 140 thereby allowing the radiation reflected by the external object to be transmitted to the receiver die 140. In the embodiment shown in FIG. 1A, the optical structure 170 may be in direct contact with the second opening 166 but distanced away from the first opening 164. In the embodiment shown in FIG. 1B, the optical structure 170 may be in direct contact with the first opening 164 but distanced away from the second opening 166. In another embodiment, the optical structure 170 may be in direct contact with both the first opening 164 and the second opening 166.

The receiver die 140 may include a photo-detector configured to convert the radiation 196, 198 into an electrical signal. For example, the receiver die 140 may have a photo-diode, or a phototransistor. The receiver die 140 may comprise amplifier circuits embedded with the photo-diode to form a single semiconductor die. The emitter die 120 and the receiver die 140 may be arranged on the substrate 110 as shown in FIG. 1A. The receiver die 140 may be optically isolated from the emitter die 120 such that the receiver die 140 does not receive the radiation emitted by the emitter die 120 without being reflected of off an external object.

The proximity-sensing device 100 may form a portion of a mobile device. The mobile device may be configured to detect movements of the external object that may be presence at the predetermined location. The movement detected by the prox-imity-sensing device 100 may be further interpreted or computed as gestures of a user. The gestures may serve as an input to the mobile device. On the other hand, when the external object is determined as a near object, the mobile device may be configured to enter power saving mode such as cut-off power supply to a display.

The external object may be present at a predetermined distance from the first surface 162 of the proximity-sensing device 100. As shown in FIG. 1A, the external object that is present at a predetermined location approximately more than 2 cm from the first surface 162 may be referred hereinafter as a far object 190. In one embodiment, a far object 190 may be positioned between 2 cm and few meters from the first surface 162 because a far object that is more than 10 meters away from the prox-imity-sensing device 100 may not be detectable. The external object that is present at a location within a close proximity less than 1cm from the first surface 162 of the proximity-sensing device 100 may be referred hereinafter as a near object 192. Depending on the distance, or whether the external object is a near object or a far object, the proximity-sensing device 100 may operate differently.

The first optical element 130 may be configured to direct a substantial amount of the radiation emitted by the emitter die 120 towards a first direction where both the far object 190 or the near object 192 may present. When a far object 190 is present, a portion of the radiation may be reflected back by the far object 190 towards the second optical element 150 of the proximity-sensing device 100 and may be subsequently received by the receiver die 140 as illustrated by ray 198. On the contrary, when a near object 192 is present, the radiation reflected by the near object 192 may be channeled by the optical structure 170 towards the second optical element 150 and subsequently received by the receiver die 140 as illustrated by ray 196. Without the optical structure 170, ray 196 may be blocked from entering the receiver die 140.

As illustrated by ray 194, the radiation emitted from the emitter die 120 may be blocked by a sidewall portion of the body 160 from reaching the second optical element 150 or the receiver die 140 directly without being reflected by the external object. In one embodiment, the body 160 may be reflective and the radiation such as ray 194 may be reflected towards the first optical element 130 and being subsequently directed towards an external object. Without presence of the external object, the emitter die 120 and the receiver die 140 may be substantially optically isolated.

The proximity-sensing device 100 may be placed within a transparent cover of a housing of a mobile device. On some occasions, the transparent cover of the housing may reflect the radiation emitted by the emitter die 120 towards the receiver die 140. The reflection by the housing is not indicative on the external object and is deemed as crosstalk. Optionally, the optical structure 170 may comprise an inner block 176. The inner block 176 may be configured to block radiation reflected by the housing from the second optical element 150. In the embodiment shown in FIG. 1A, the inner block 176 may be configured to block radiation that may be reflected by any external object, including a housing cover that may be less than 2 mm from the first surface 162 of the body 160.

In another embodiment, the optical structure 170, the first optical element 130 and the second optical element 150 may be configured such that the radiation reflected from the external object enters the second optical element 150 via the optical structure 170 when the external object is present at a predetermined close distance that is less than 3 mm from the first surface 162 of the body 160. When the external object is present at a predetermined far distance that may be more than 1cm from the first surface 162 of the body 160, the radiation reflected from the external object may enter the second optical element 150 without being transmitted through the optical structure 170. The predetermined further distance may be at least three times the predetermined close distance. Optionally, the proximity-sensing device 100 may comprise the inner block 176 that intercept radiation reflected by a housing surface that covers the first surface 162.

In yet another embodiment, the optical structure 170 may comprise at least one trench established through at least a portion of the body 160, and optionally a substantially transparent material may be formed within the at least one trench acting as a light guide. The at least one trench may have a first end adjacent to the second optical element 150, and a second end that is adjacent to the first optical element 130. The first end of the at least one trench may have a first depth whereas the second end of the at least one trench may have a second depth substantially different from the first depth. The first end may be touching and in direct contact with the second optical element 150. On the contrary, the second end may be distanced away from the first optical element 130 and thus, optically isolated from the first optical element 130 unless an external object reflect the radiation emitted from the emitter die 120 via the first optical element 130 towards the optical structure 170.

The optical structure 170 may be a trench or a void through a portion of the body 160 to form a radiation or light guide. Alternatively, the optical structure 170 may be a substantially transparent radiation or light guide configured to transmit radiation in a controlled manner. The optical structure 170 may be implemented in many forms as illustrated in the embodiments shown in FIGS. 2A-2D, FIG. 3, FIG. 4, FIG. 5 and FIG. 6.

Figure 2A:
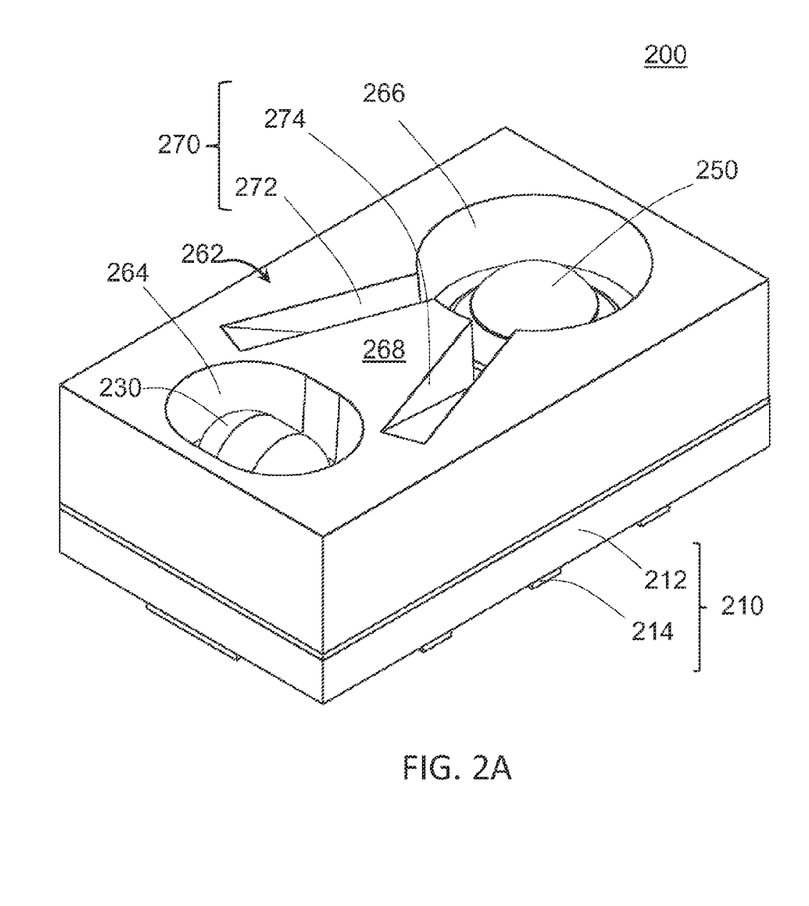
FIG. 2A illustrates a perspective view of a sensing device.
Figure 2B:
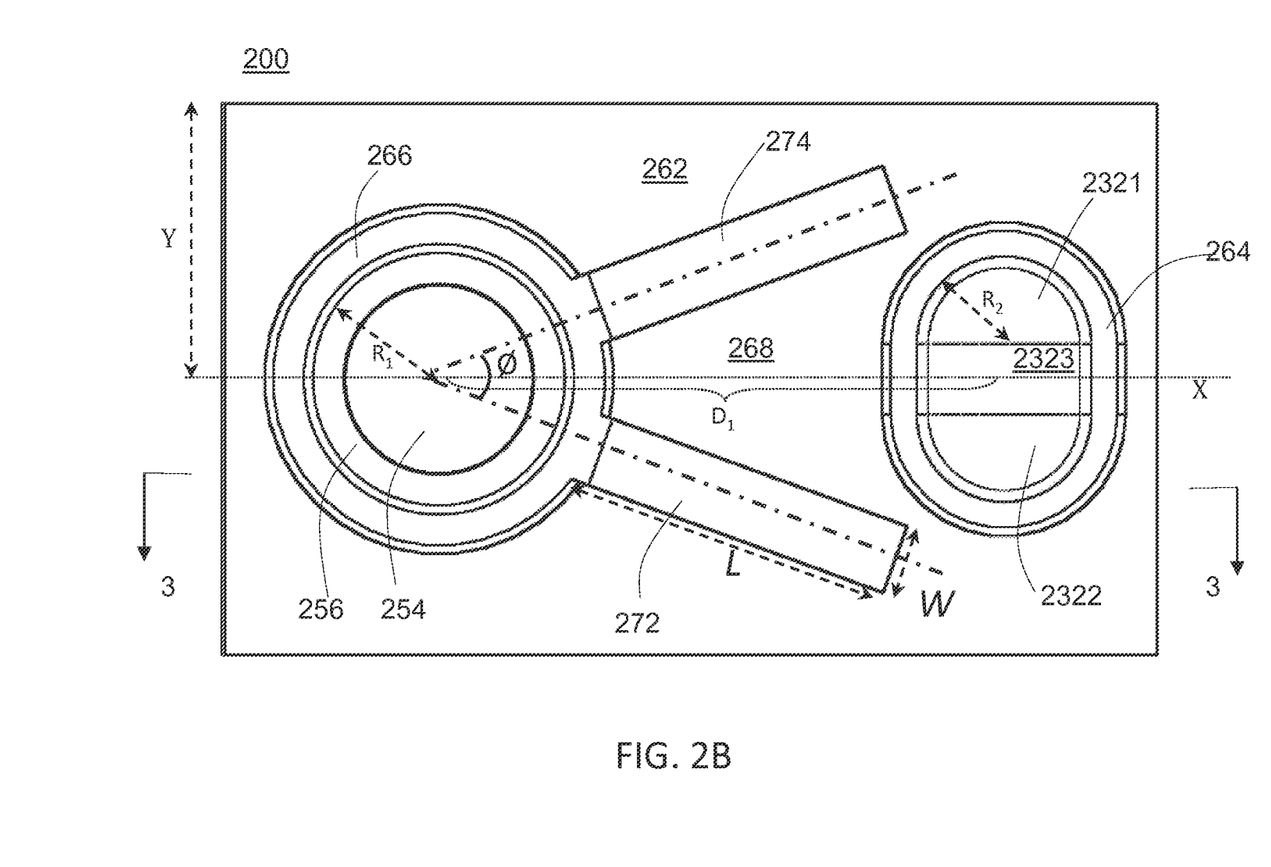
FIG. 2B illustrates a top view of the sensing device shown in FIG. 2A.
Figure 2C:
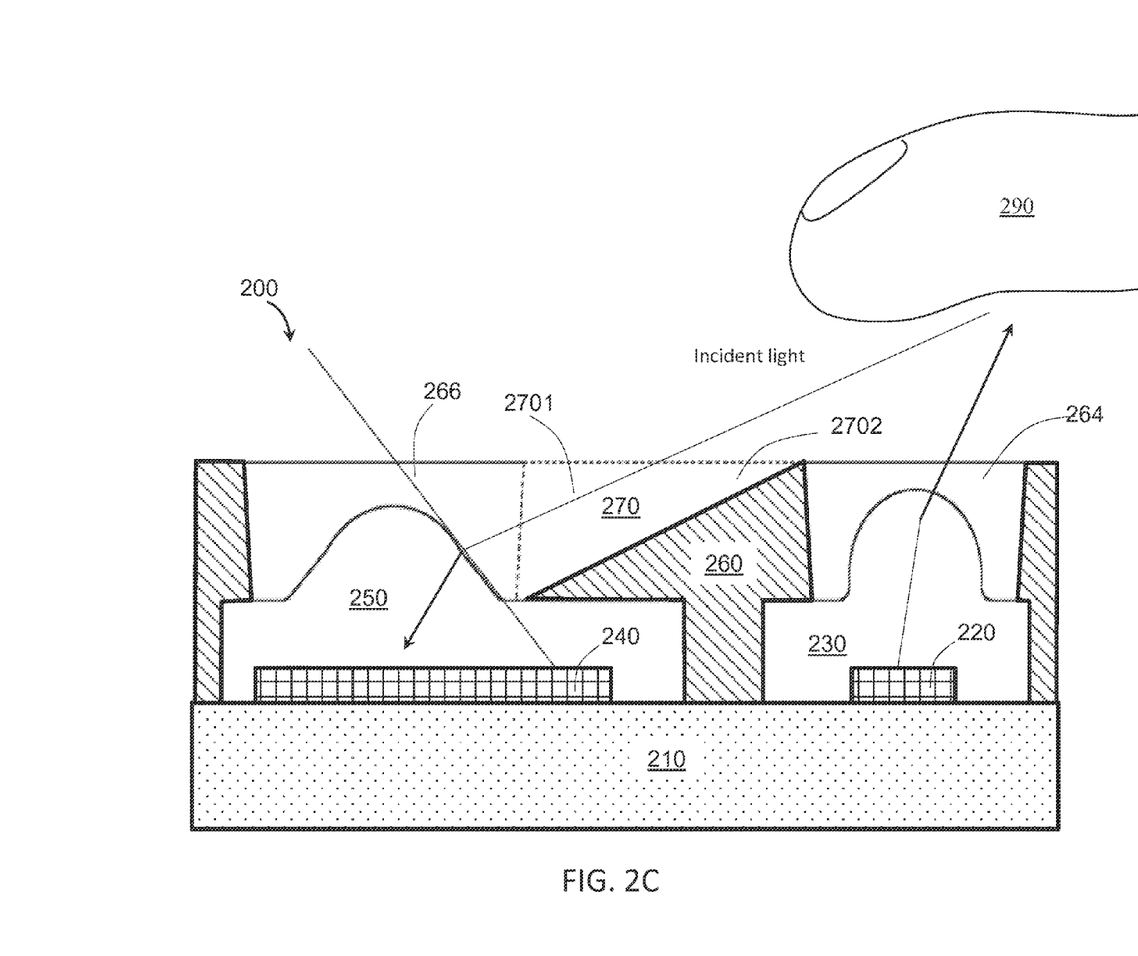
FIG. 2C illustrates a cross-sectional view of the sensing device along line 3-3 shown in FIG. 2B.
Figure 2D:
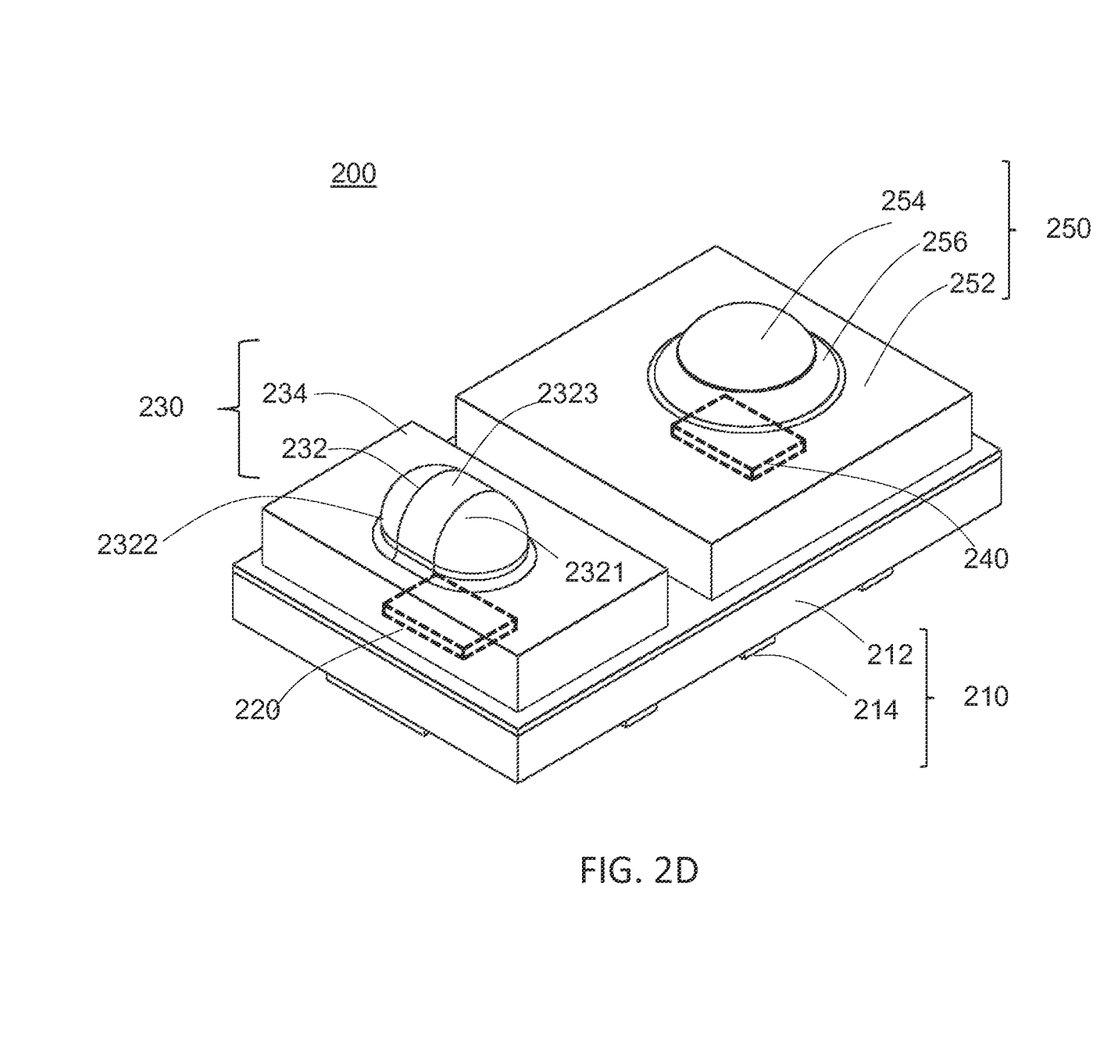
FIG. 2D illustrates a perspective view of inner portions of the sensing device shown in FIG. 2A before the body is formed.

FIG. 2A illustrates a perspective view of a sensing device 200 for detecting an external object 290. FIG. 2B illustrates a top view of the proximity-sensing device 200 shown in FIG. 2A whereas FIG. 2C illustrates a cross-sectional view of the sensing device 200 along line 3-3 shown in FIG. 2C. FIG. 2D illustrates a perspective view of inner portions of the sensing device 200. For illustration purpose, a finger is drawn as the external object 290 in FIG. 2D but it should be understood that the external object 290 is not limited per the illustration in the drawings.

Referring to FIGS. 2A-2D, the sensing device 200 may comprise an emitter die 220, a receiver die 240, and a body 260. Optionally, the sensing device 200 may comprise a substrate 210, an emitter lens structure 230, and a receiver lens structure 250. The emitter die 220 may be configured to emit a radiation, and the receiver die 240 may be configured to receive the radiation emitted by the emitter die 220 and subsequently reflected by the external object 290. The substrate 210 may comprise a plurality of leads 214 encapsulated by an epoxy material or a silicone material 212 that may be substantially similar to the material forming the body 260.

The body 260 may be covering substantially the emitter die 220 and the receiver die 240. The body 260 may comprises a first surface 262 having at least two trenches 270 on the first surface 262. The first surface 262 of the body 260 may be positioned facing the external object 290 that is to be detected by the sensing device 200. The at least two trenches 270 may be optically coupled to at least one of the receiver die 240 and the emitter die 220. In the embodiment shown in FIGS. 2A-2D, the at least two trenches 270 are optically coupled to the receiver die 240.

The body 260 may comprise an emitter opening 264 and a receiver opening 266. The emitter opening 264 may be configured to accommodate the emitter lens structure 230 such that the radiation emitted by the emitter die 220 and subsequently transmitted through the emitter lens structure 230 may be directed towards the external object 290 through the emitter opening 264. The receiver opening 266 on the other hand may accommodate the receiver lens structure 250 such that the radiation reflected from the external object 290 may enter the receiver lens structure 250 and subsequently received by the receiver die 240.

The at least two trenches may comprise a first trench 272 and a second trench 274. The first trench 272 and the second trench 274 may comprise a first elongated optical path and a second elongated optical path configured to channel the radiation towards the receiver lens structure 250 respectively. Each of the first and second elongated optical paths may have a tapering depth with one end with deeper depth in direct contact with the receiver opening 266. The tapering depth configuration may be beneficial to increase effectiveness of the optical paths to channel the reflected radiation towards the receiver lens structure 250.

As can be seen in various drawings of the embodiment, the first trench 272 and the second trench 274 may intersect at the receiver opening 266. As shown in FIG. 2A and FIG. 2B, the first trench 272, the second trench 274 may form an angle Ø that is less than sixty degrees. Thus the first trench 272, the second trench 274 and the receiver opening 266 may form a substantially V-shape as shown in FIG. 2B. Referring to FIG. 2B, the receiver lens structure 250 has a radius $R_1$. The emitter lens structure 230 has a radius $R_2$. The emitter lens structure 230 may be positioned at a distance $D_1$ away from the receiver lens structure 250. The body 160 may be elongated having a width of 2Y. The angle Ø may be selected such that the angle Ø satisfies Equation (1) below:

$$\emptyset \le \tan^{-1}\left(\frac{Y}{D_1 - R_2}\right) \qquad \text{Equation (1)}$$

Each of the at least two trenches 272, 274 has a width dimension W and a length dimension L. The at least two trenches 272, 274 may be formed such that the width dimension W is relatively smaller than the radius $R_1$ of the receiver lens structure 250, and the length dimension L may smaller than difference between the distance D1, and the sum of the radius $R_1$ of the receiver lens structure 250 and the radius $R_2$ of the emitter lens structure 230 as illustrated in Equation (2).

$$L \leq D_1 - R_1 - R_2 \quad \text{Equation (2)}$$

Optionally, the sensing device 200 may further comprise an optical block 268 formed between the at least two trenches 272, 274. The optical block 268 may be configured to block radiation reflected by an external housing surface covering the sensing device 200. The external housing surface may be the closest object to the sensing device 200 that may reflect radiation emitted by the emitter die 220 back to the sensing device 200. Generally, the external housing surface may be substantially transparent to the radiation emitted by the emitter die 220, but on some occasions, the radiation emitted by the emitter die 220 may be reflected due to total internal reflection. The sensing device 200 may extend longitudinally along a center axis X, that extends through the center of the emitter die 220 and the center of the receiver die 240. The optical block 268 may be formed on the center axis X of the package whereas the at least two trenches 272, 274 may be provided symmetrically relative to the center axis X. With this arrangement, an external object 290 that is at a predetermined proximity may be channeled back to the receiver die 240 through the at least two trenches 272, 274 whereas an external object that is present at a location closer to the predetermined proximity may be blocked by the optical block 268.

FIG. 2C illustrates a cross-sectional view of the sensing device 200 approximately along line 3-3 shown in FIG. 2B. As illustrated in FIG. 2C, each of the at least two trenches 272, 274 may have a deeper end 2701 adjoining the receiver opening 266, and a shallower end 2702 adjacent to the emitter opening 264. Optionally, the shallower end 2702 may be distanced away from the emitter opening 264. The tapering shape of the at least two trenches 272, 274 may enable the radiation emitted by the emitter die 220 and reflected by an external object 290 that is present at close proximity back to the receiver die 240. Without the at least two trenches 272, 274, the reflected radiation may be otherwise blocked by the optical block 268 of the body 260.

The emitter lens structure 230 and the receiver lens structure 250 may be molded from a substantially transparent encapsulant such as epoxy or silicone. The substantially transparent encapsulant may have a transmissivity of 90% and above. Referring to FIG. 2B and FIG. 2D, the emitter lens structure 230 may have a lens portion 232 and a base portion 234. The base portion 234 of the emitter lens structure 230 may be encapsulating the emitter die 220. The lens portion 232 of the emitter lens structure 230 may be a single dome lens. In the embodiment shown in FIG. 2C, the lens portion 232 of the emitter lens structure 230 may comprise a double lens structure with a first lens 2321 and a second lens 2322 interconnected by a center portion 2323. The double lens structure with the first lens 2321 and the second lens 2322 formed outside a center axis X may enable longer optical path within the package of the sensing device 200.

Similarly, the receiver lens structure 250 may comprise a base portion 252 and a lens portion 254. The base portion 252 of the receiver lens structure 250 may be encapsulating the receiver die 240. The lens portion 254 of the receiver lens structure 250 may be configured to receive radiation reflected from the external object 290. In addition, the receiver lens structure 250 may further comprise a side surface portion 256 optically coupled to the at least two trenches 272, 274 so as to receive radiation emitted by the emitter die 220 and reflected by the external object 290 positioned in close proximity to the sensing device 200.

Figure 2E:
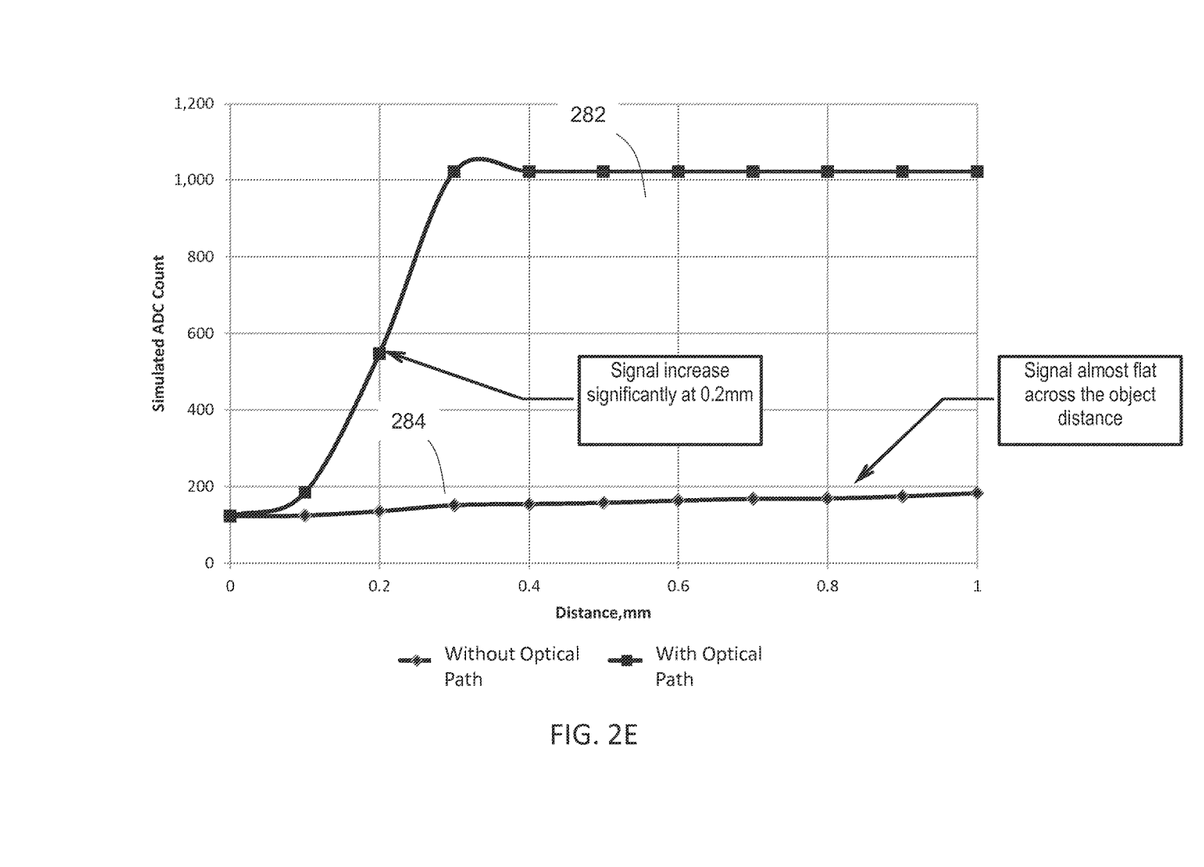
FIG. 2E illustrates an evaluation result of the sensing device shown in FIG. 2A.

FIG. 2E illustrates an evaluation result of the sensing device 200 shown in FIG. 2A. The X-axis of the graph illustrates distance of an external object measuring perpendicularly from the first surface 262 of the sensing device 200. The Y-axis of the graph illustrates the reading of the sensing device 200 outputs in terms of a digital count of an analog-to-digital (referred as 'ADC') of the sensing device 200. Without the optical path provided by the at least two trenches 270, the sensing device 200 may be unable to detect presence of an external object 290 that may be positioned less than 1mm from the first surface 262 of the sensing device 200. The output of the sensing device 200 increases significantly when the external object 290 is positioned between 0.2 mm to 0.4 mm from the first surface 262.

When the sensing device 200 is housed within an external housing of a mobile device, the sensing device 200 may be positioned such that a transparent housing surface may be positioned less than 0.2 mm from the first surface 262 of the sensing device 200. The housing surface may have a thickness of 0.2 mm and therefore, any external object that touches the housing surface may be at least 0.4 mm from the first surface 262 and may be detected. Radiation reflected back by total internal reflection caused by the housing surface may be blocked and not detected as the housing surface may be placed less than 0.2 mm from the first surface 262 of the sensing device 200.

Figure 3:
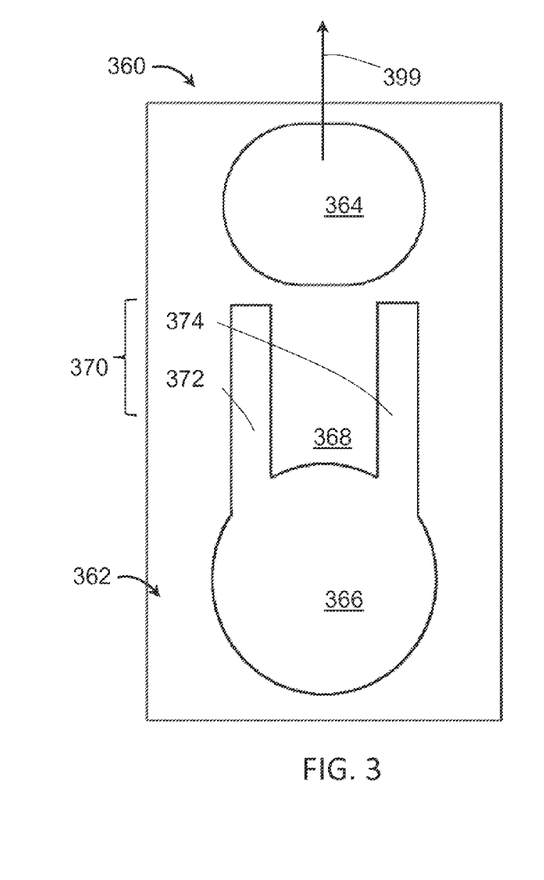
FIG. 3 illustrates a top view of a first alternative design having two parallel trenches.

FIG. 3 illustrates a top view of a body 360 as an alternative design to be used in place of the body 260 of the sensing device 200 shown in FIG. 2A. As illustrated in FIG. 3, the body 360 may comprise a first surface 362, an emitter opening 364, a receiver opening 366, an optical structure 370 having a first trench 372 and a second trench 374 and an inner block 368. The inner block 368 may be provided between the first trench 372 and the second trench 374. The emitter opening 364, the receiver opening 366, the inner block 368 and the optical structure 370 may be formed on the first surface 362 of the body 360. The optical structure 370 in FIG. 3 may be substantially similar to the at least two trenches 272, 274 shown in FIG. 2A but may at least differ in that the first trench 372 and the second trench 374 may be substantially parallel. In addition, as shown in FIG. 3, the emitter opening 364 and the receiver opening 366 may be provided along a center axis 399. The first trench 372 and the second trench 374 may be substantially parallel to the center axis 399.

Figure 4:
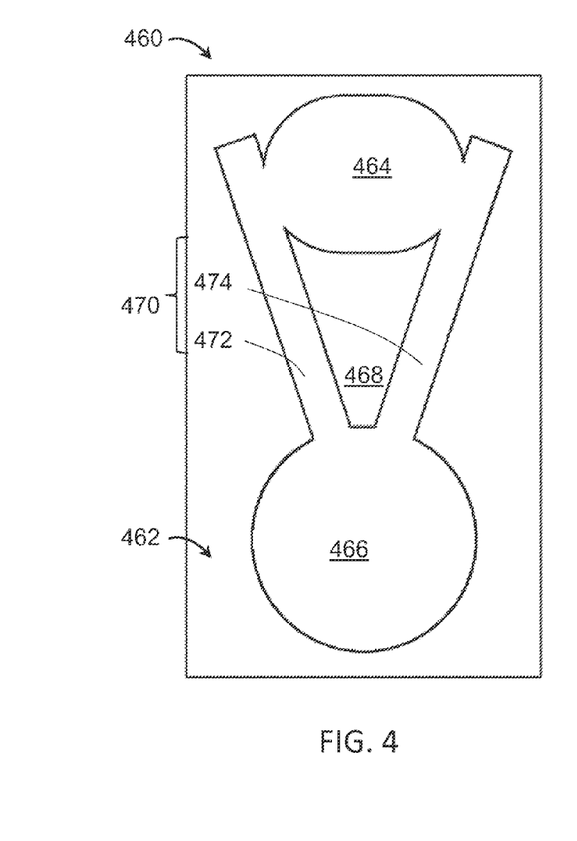
FIG. 4 illustrates a top view of a second alternative design having extended V-shape trenches.

FIG. 4 illustrates a top view of a body 460 as an alternative design to be used in place of the body 260 of the sensing device 200 shown in FIG. 2A As illustrated in FIG. 4, the body 460 may comprise a first surface 462, an emitter opening 464, a receiver opening 466, and inner block 468 and an optical structure 470 having a first trench 472 and a second trench 374. The emitter opening 464, the receiver opening 466, the inner block 468 and the optical structure 470 may be formed on the first surface 462 of the body 460. The optical structure 470 in FIG. 4 may be substantially similar to the at least two trenches 270 shown in FIG. 2A but may at least differ in that the first trench 472 and the second trench 474 may be in direct contact with the emitter opening 464. As the first trench 472 and the second trench 474 are tapered, with the shallower end in direct contact with the emitter opening 464. The first trench 472 and the second trench 474 of the optical structure 470 may be formed such that radiation emitted from the emitter die may not enter directly to the optical structure 470 but via reflections by an external object.

Figure 5:
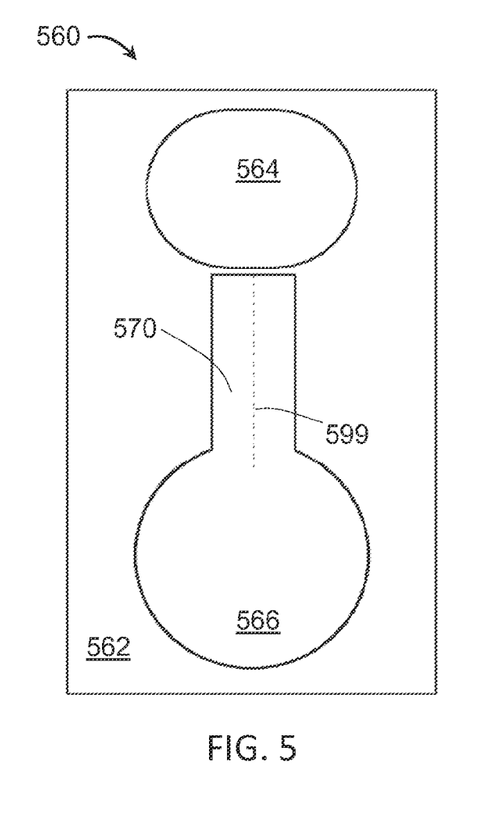
FIG. 5 illustrates a top view of a third alternative design having a single wide trench.

FIG. 5 illustrates a top view of a body 560 as an alternative design to be used in place of the body 260 of the sensing device 200 shown in FIG. 2A. As illustrated in FIG. 5, the body 560 may comprise a first surface 562, an emitter opening 564, a receiver opening 566, and an optical structure 570. The emitter opening 564, the receiver opening 566, and the optical structure 570 may be formed on the first surface 562 of the body 560. The optical structure 570 in FIG. 3 may be substantially similar to the at least two trenches 270 shown in FIG. 2A but may at least differ in that the optical structure 570 comprise a single trench. The optical structure 570 may be tapered, and may have a width substantially wider than the receiver lens. The optical structure 570, the emitter opening 564 and the receiver opening 566 may be sym-metrical relative to a center axis 599.

Figure 6:
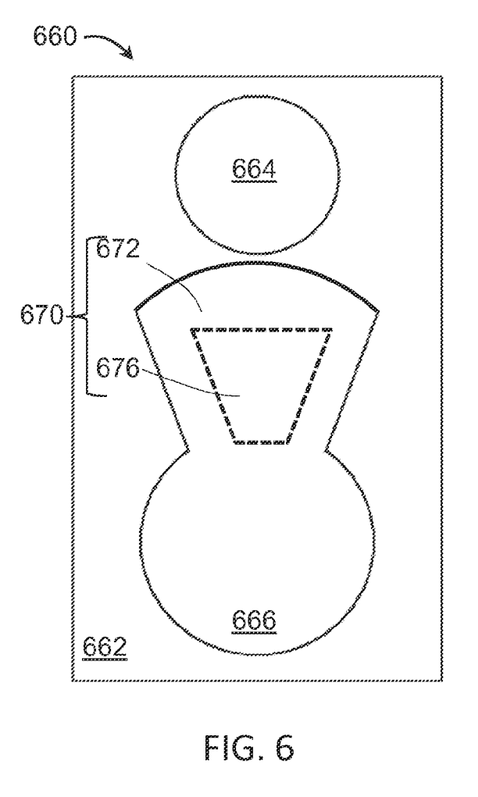
FIG. 6 illustrates a top view of a fourth alternative design having a annular circle shaped trench with an inner block.

FIG. 6 illustrates a top view of a body 660 as an alternative design to be used in place of the body 260 of the sensing device 200 shown in FIG. 2A As illustrated in FIG. 6, the body 660 may comprise a first surface 662, an emitter opening 664, a receiver opening 666, and inner block 668 and an optical structure 670. The emitter opening 664, the receiver opening 666, and the optical structure 670 may be formed on the first surface 662 of the body 660. The optical structure 670 in FIG. 6 may be substantially similar to the at least two trenches 270 shown in FIG. 2A but may at least differ in that the optical structure 670 may comprise a trench 672 having a partial annular circle shape as shown in FIG. 6. In addition, the optical structure 670 may comprise an inner block 676 formed not on the first surface but within the optical structure 670.

Figure 7:
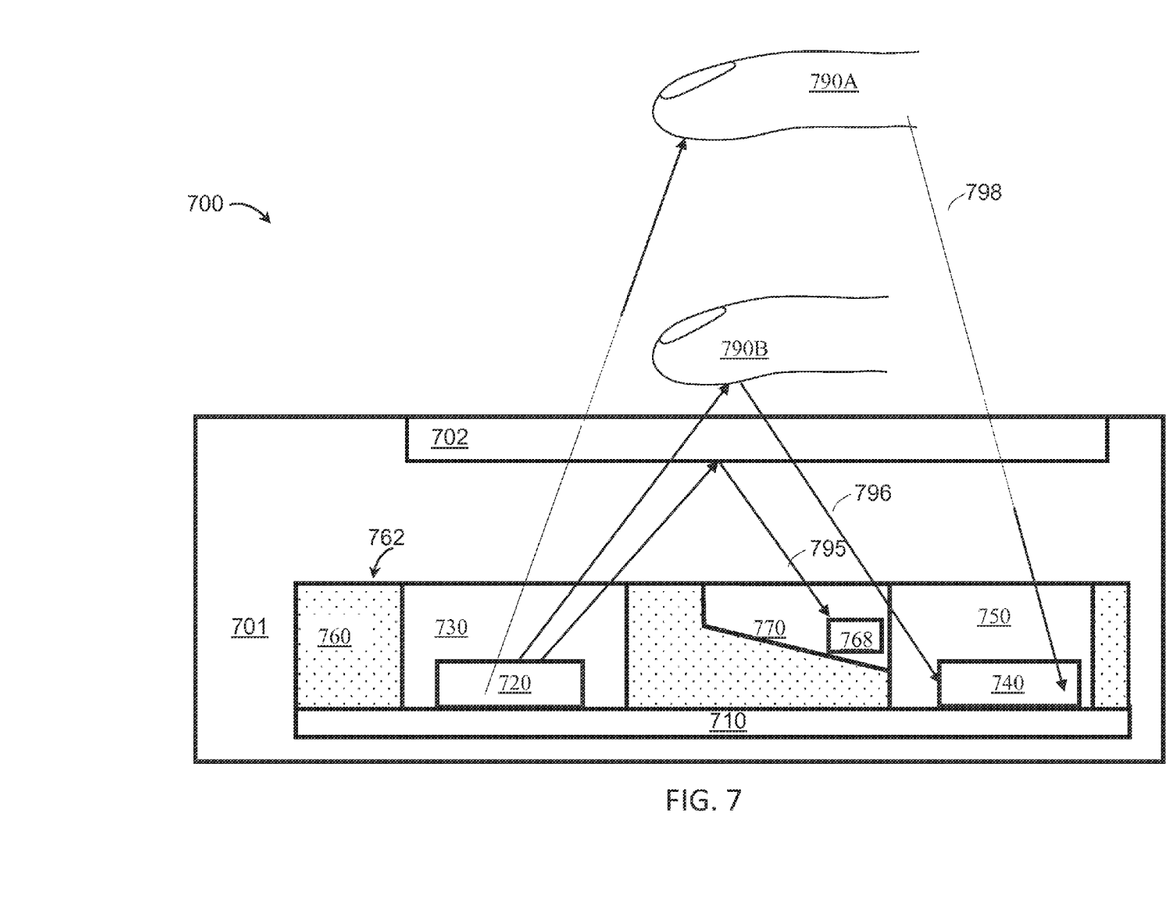
FIG. 7 illustrates an illustrative bock diagram of a mobile device having a substantially transparent panel.

FIG. 7 is a bock diagram of a mobile device 700. The mobile device 700 may correspond to any type of mobile electronic device including, without limitation, a cellular phone, a smartphone, a tablet, a laptop, a Personal Digital Assistant (PDA), a wearable (e.g., smart watch, smart band, glasses, etc.). In some embodiments, the mobile device 700 may comprise a housing 701 having a substantially transparent panel 702, an emitter die 720 configured to emit a radiation towards an external object through the substantially transparent panel 702, a receiver die 740 configured to receive the radiation reflected by the external object, and an optical structure 770 configured to provide an optical path to transmit radiation reflected from the external object towards the receiver die 740 when the external object is present at a distance approximately less than two millimeters from the substantially transparent panel 702.

Optionally, the mobile device may comprise a body 760 configured to cover substantially the emitter die 720 and the receiver die 740. The body 760 may comprise an emitter opening 730 and a receiver opening 750 corresponding to the emitter die 720 and the receiver die 740. The body 760 may have a first surface 762 oriented facing the external object. The body 760 may further comprise an inner block 768 configured to block radiation reflected by the substantially transparent panel 702.

As illustrated in FIG. 7, ray 798 emitted by the emitter die 720 towards a far object 790A that may be present at least more than 10 mm from the substantially transparent panel 702 may be reflected towards the receiver die via the receiver opening 750. Ray 796 emitted by the emitter die 720 towards a near object 790B that may be present less than 2 mm from the substantially transparent panel 702 may be reflected towards the receiver die via the optical structure 770 and the receiver opening 750. Without the optical structure 770, a portion of the body 760 may otherwise block ray 796. The inner block 768 may block ray 795 emitted by the emitter die 720 but reflected back towards the receiver die 740 by the substantially transparent panel 702.

Figure 8:
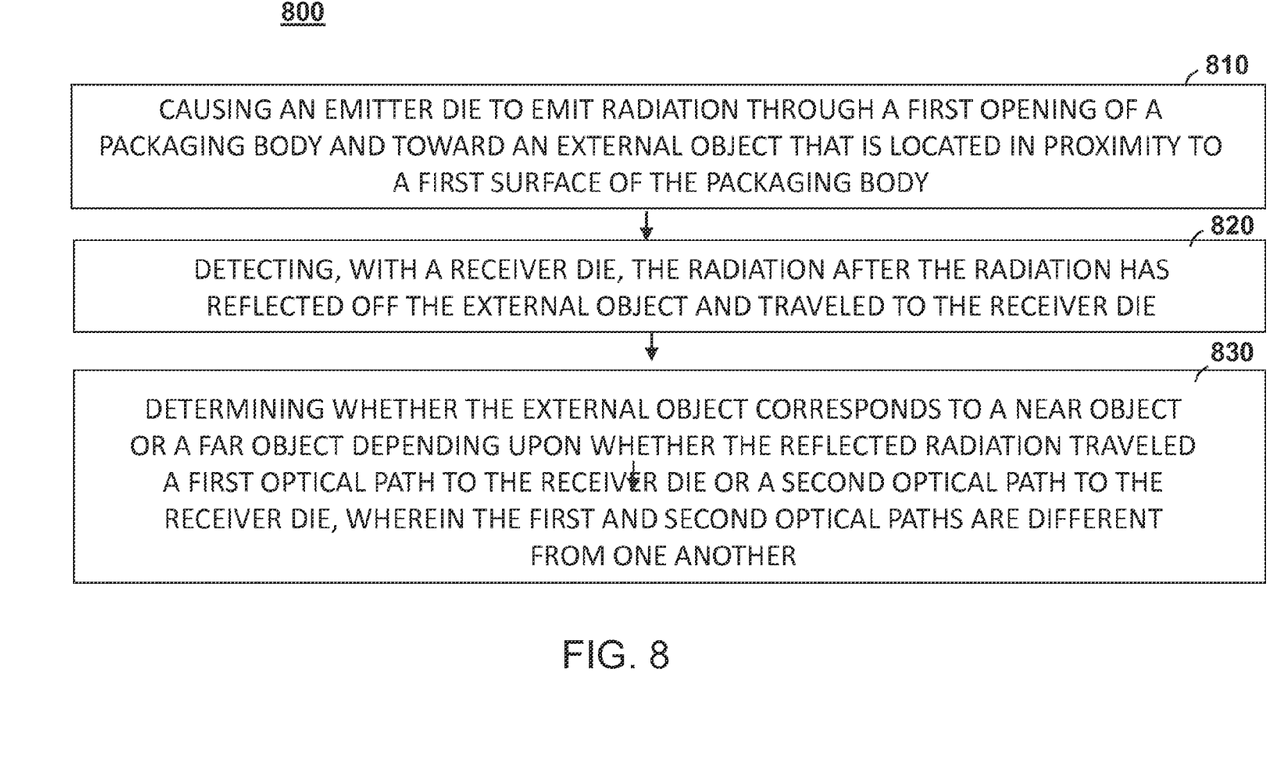
FIG. 8 illustrates a flow chart showing a method for sensing an external object.

FIG. 8 illustrates a flow chart showing a method 800 for sensing an external object. In step 810, an emitter die may be caused to emit radiation through a first opening of a packaging body and toward an external object that is located in prox-imity to a first surface of the packaging body. Next in step 820, the radiation after the radiation has reflected off the external object and traveled to the receiver die may be detected, with a receiver die. Subsequently, step 830 may be employed to determine whether the external object corresponds to a near object or a far object depending upon whether the reflected radiation traveled a first optical path to the receiver die or a second optical path to the receiver die. The first and second optical paths are different from one another. For example, the first optical path may involve an external object positioned at least 2 cm from the emitter die whereas the second optical path may involve an external object positioned less than 4 mm from the emitter die.

Different aspects, embodiments or implementations may, either individu-ally and/or in combination, but need not, yield one or more of the following ad-vantages. Each of the optical structures 170, 270, 370, 470, 570 and 670 may have a significant improve results depending on where the sensing devices 100 and 200 is to be used. Although different aspects have been presented in each embodiment, all or part of the different aspects illustrated in each embodiment may be combined. For example, the optical devices shown in FIG. 1A, FIGS. 2A-2D, FIG. 3, FIG. 4, FIG. 5, and FIG. 6 may be employed in the mobile device shown in FIG. 7. Each features shown in FIG. 3, FIG. 4, FIG. 5 and FIG. 6 may be employed in FIG. 1A and FIGS. 2A-2D.

Various embodiments of the invention are contemplated in addition to those disclosed hereinabove. Although specific embodiments of the invention have been described and illustrated, the invention is not to be limited to the specific forms or arrangements of parts so described and illustrated. The above-described embodiments should be considered as examples of the present invention, rather than as limiting the scope of the invention. In addition to the foregoing embodiments of the invention, review of the detailed description and accompanying drawings will show that there are other embodiments of the invention. Accordingly, many combinations, per-mutations, variations and modifications of the foregoing embodiments of the invention not set forth explicitly herein will nevertheless fall within the scope of the invention. It is to be understood that the illustration and description shall not be interpreted narrowly.

What is claimed is:
1. A proximity-sensing device for detecting movement of an external object in prox-imity thereto, comprising:
an emitter die configured to emit a radiation;
a first optical element in optical communication with the emitter die;
a receiver die configured to receive the radiation reflected by the external object;
a second optical element in optical communication with the receiver die; and
a body substantially covering the emitter die and the receiver die, wherein the body comprises:
a first surface configured to face the external object;
a first opening formed on the first surface of the body, the first opening configured to accommodate the first optical element;

a second opening formed on the first surface of the body adjacent to the first opening, the second opening configured to accommodate the second optical element; and an optical structure provided on the first surface of the body, wherein the optical structure is formed adjacent to and in direct contact with at least one of the first opening and the second opening.

2. The proximity-sensing device of claim 1, wherein the optical structure comprises an optical path provided between the first surface of the body and the receiver die thereby allowing the radiation reflected by the external object to be transmitted to the receiver die.

3. The proximity-sensing device of claim 1, wherein the optical structure, the first optical element and the second optical element are configured such that the radiation reflected from the external object enters the second optical element via the optical structure when the external object is present at a predetermined close distance that is less than 3 mm from the first surface.

4. The proximity-sensing device of claim 3, wherein the optical structure, the first optical element and the second optical element are configured such that radiation reflected from the external object enters the second optical element without being transmitted through the optical structure when the external object is present at a predetermined far distance that is more than 1 cm from the first surface, and wherein the predetermined further distance is at least three times the predetermined close distance.

5. The proximity-sensing device of claim 4, wherein the optical structure further comprises an inner block configured to intercept radiation reflected by a housing surface that covers the first surface.

6. The proximity-sensing device of claim 1, wherein the optical structure has a tapering thickness.

7. The proximity-sensing device of claim 1, wherein the optical structure comprises at least one trench.

8. The proximity-sensing device of claim 7, wherein the at least one trench has a first end adjacent to the second optical element and a second end adjacent to the first optical element.

9. The proximity-sensing device of claim 8, wherein the first end of the at least one trench is optically coupled to the second optical element.

10. The proximity-sensing device of claim 8, wherein the second end of the at least one trench is distanced away from the first optical element.

11. The proximity-sensing device of claim 8, wherein the first end of the at least one trench has a first depth, and a second end of the at least one trench has a second depth, wherein the first depth is deeper than the second depth.

12. The proximity-sensing device of claim 1, wherein the second optical element comprises:
a base portion covering the receiver die;
a side surface portion optically coupled to the optical structure; and
a lens portion configured to receive radiation reflected from the external object.

13. The proximity-sensing device of claim 1, wherein the optical structure is in direct contact with the second opening but distanced away from the first opening.

14. The proximity-sensing device of claim 1, wherein the optical structure comprises two elongated optical paths, and wherein the two elongated optical paths intersect at one of the first and second openings to form a substantially V-shape.

15. A mobile device, comprising the proximity-sensing device as recited in claim 1.

16. A sensing device for detecting an external object, comprising:
an emitter die configured to emit a radiation;
a receiver die configured to receive the radiation emitted by the emitter die and subsequently reflected by the external object;
a body substantially covering the emitter die and the receiver die, wherein the body comprises a first surface having at least two trenches on thereon, wherein the first surface faces the external object, and wherein the two trenches are optically coupled to at least one of the receiver die and the emitter die.

17. The sensing device of claim 16, wherein the two trenches form an angle that is less than sixty degrees.

18. The sensing device of claim 16 further comprising an optical block formed between the at least two trenches, wherein the optical block is configured to block radiation reflected by an external housing surface covering the sensing device.

19. The sensing device of claim 16, wherein:
each of the two trenches is elongated having a length measurement and a width measurement;
the body comprises an opening having a radius; and
the width measurement is smaller than the radius of the opening of the body.

20. A method for sensing an object, comprising:
causing an emitter die to emit radiation through a first opening of a packaging body and toward an external object that is located in proximity to a first surface of the packaging body;
detecting, with a receiver die, the radiation after the radiation has reflected off the external object and traveled to the receiver die; and
determining whether the external object corresponds to a near object or a far object depending upon whether the reflected radiation traveled a first optical path to the receiver die or a second optical path to the receiver die, wherein the first and second optical paths are different from one another.

* * * * *